No. 686,254. Patented Nov. 12, 1901.
H. H. BRIDGWATER & J. HALEY.
APPARATUS FOR CONVEYING GLASSWARE INTO AND THROUGH ANNEALING OVENS.
(Application filed Oct. 15, 1900.)
(No Model.) 6 Sheets—Sheet 3.
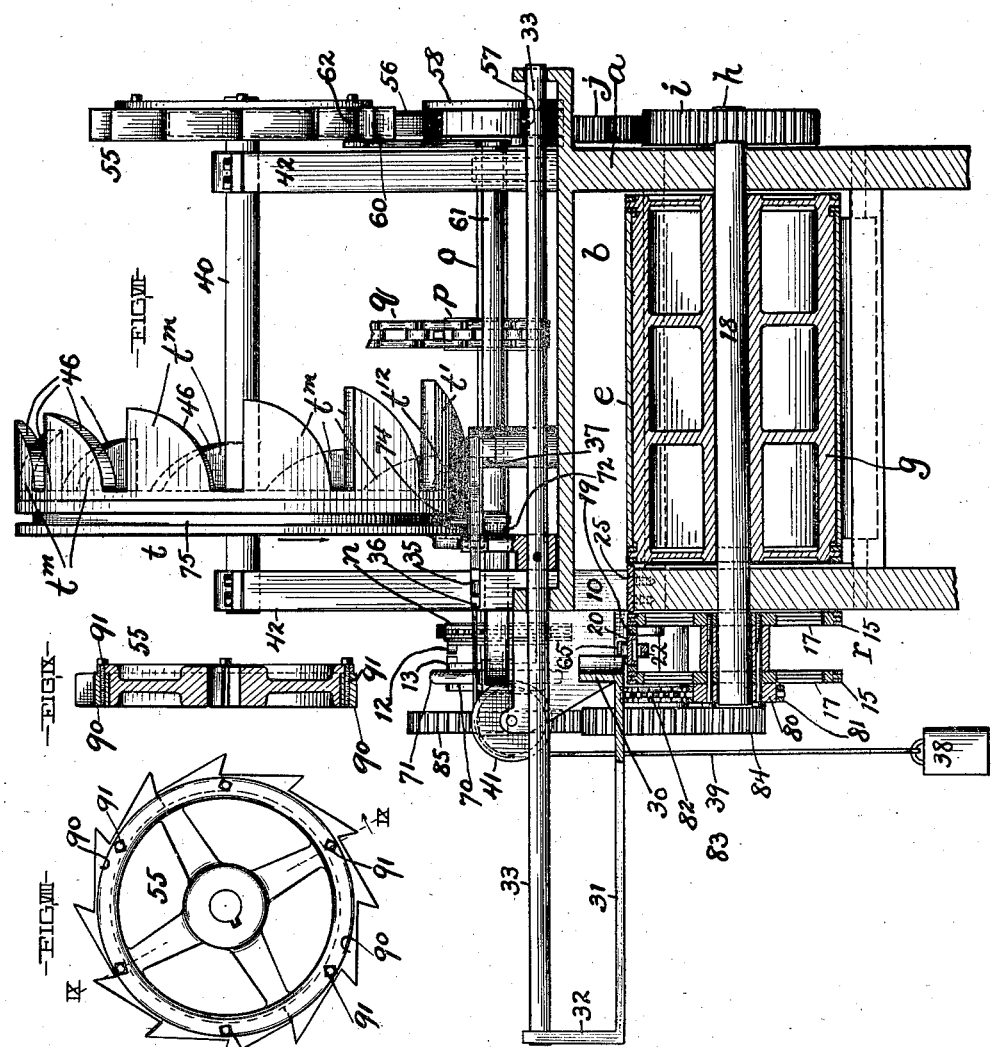
WITNESSES:
INVENTORS
Harry H Bridgwater
and
Jonathan Haley
BY
Lynch & Dorer
Their ATTORNEYS

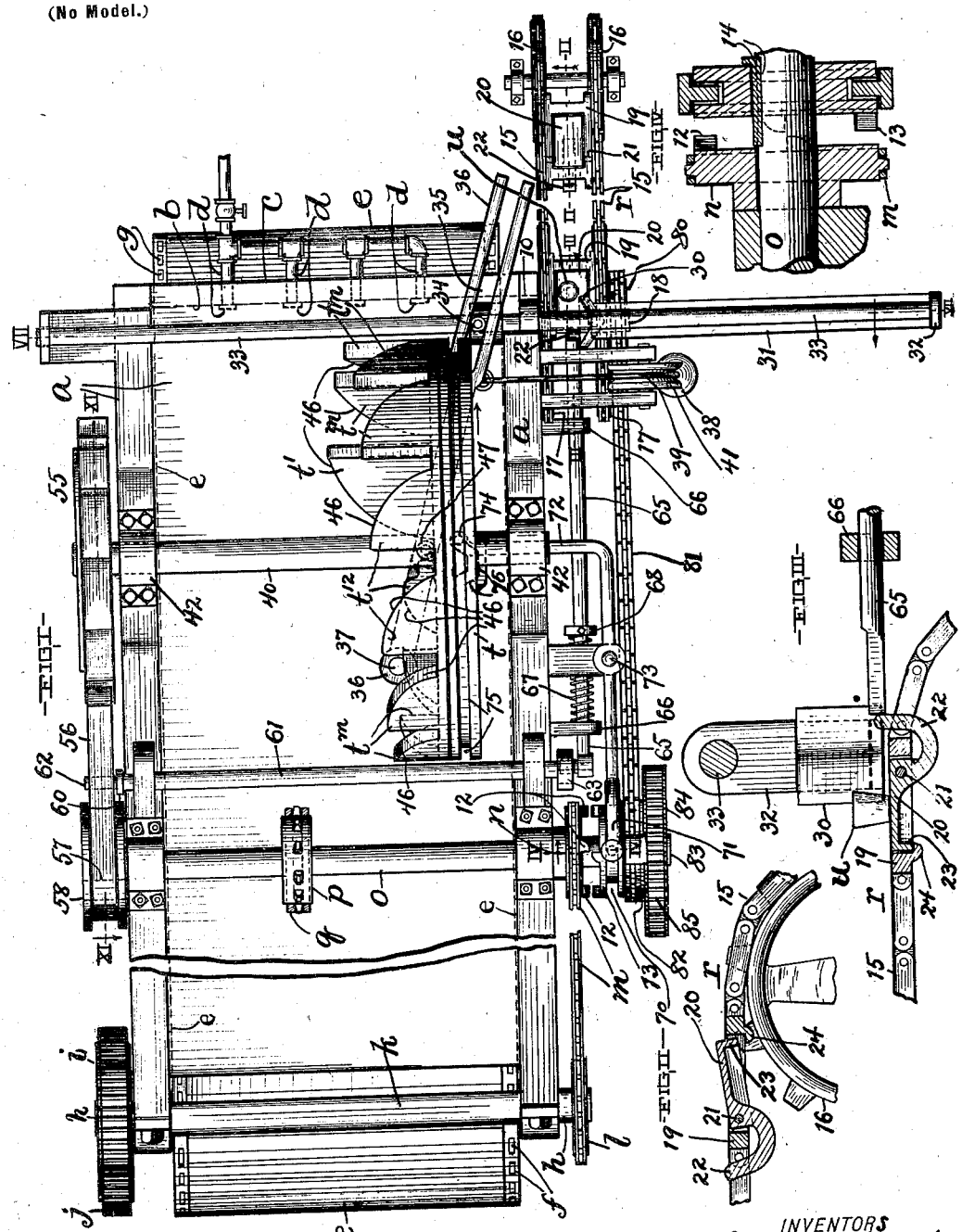

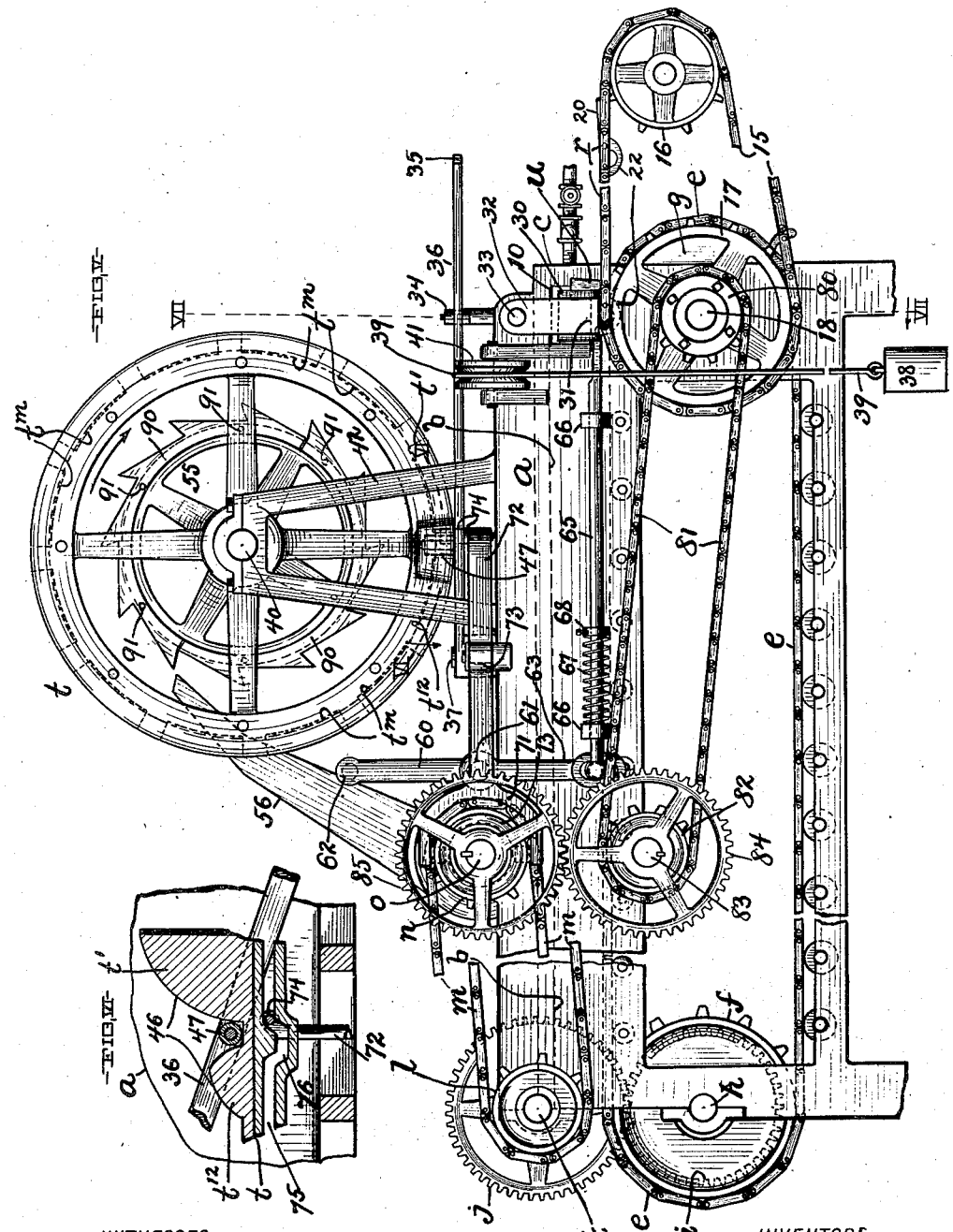

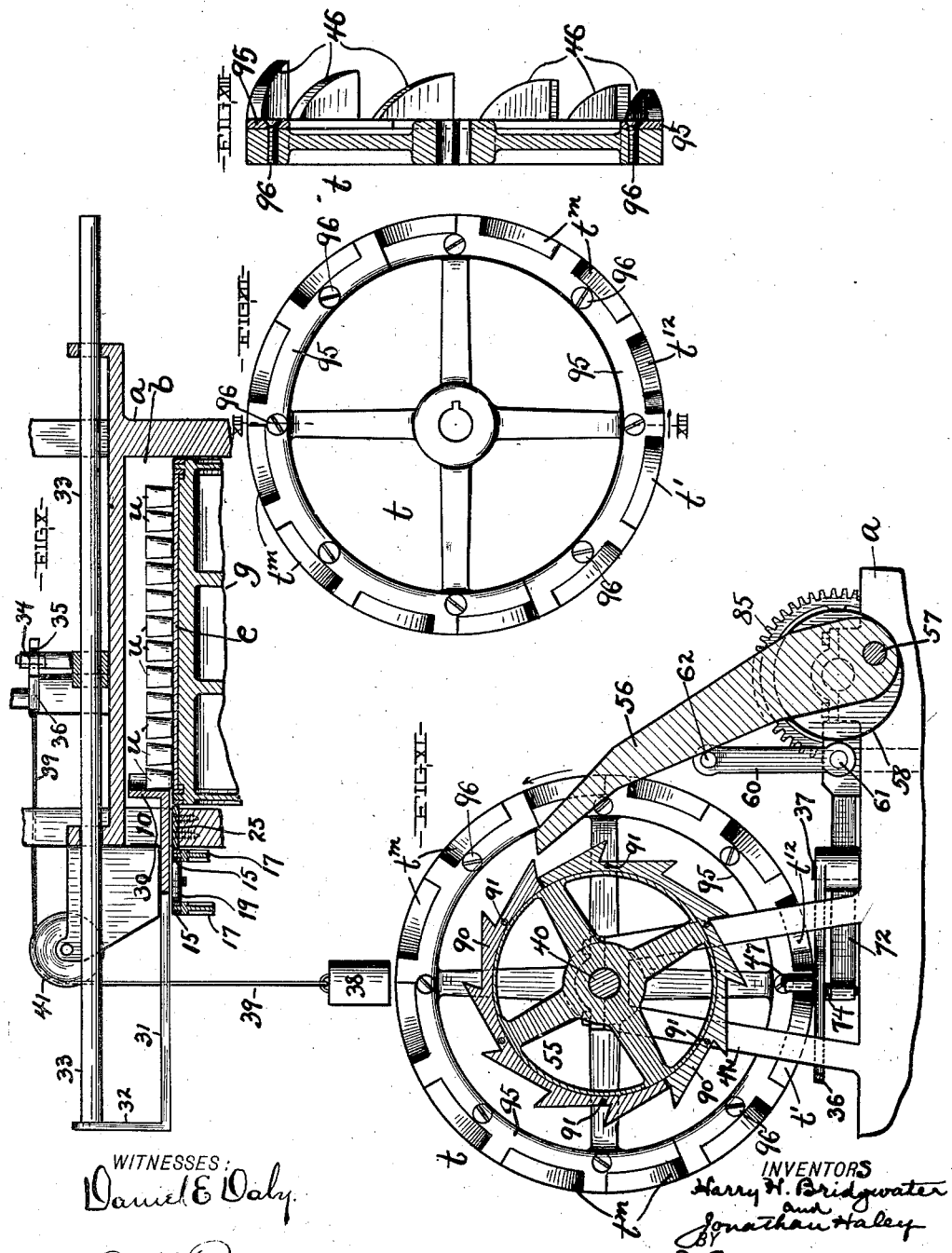

No. 686,254. Patented Nov. 12, 1901.
H. H. BRIDGWATER & J. HALEY.
APPARATUS FOR CONVEYING GLASSWARE INTO AND THROUGH ANNEALING OVENS.
(Application filed Oct. 15, 1900.)
(No Model.) 6 Sheets—Sheet 5.
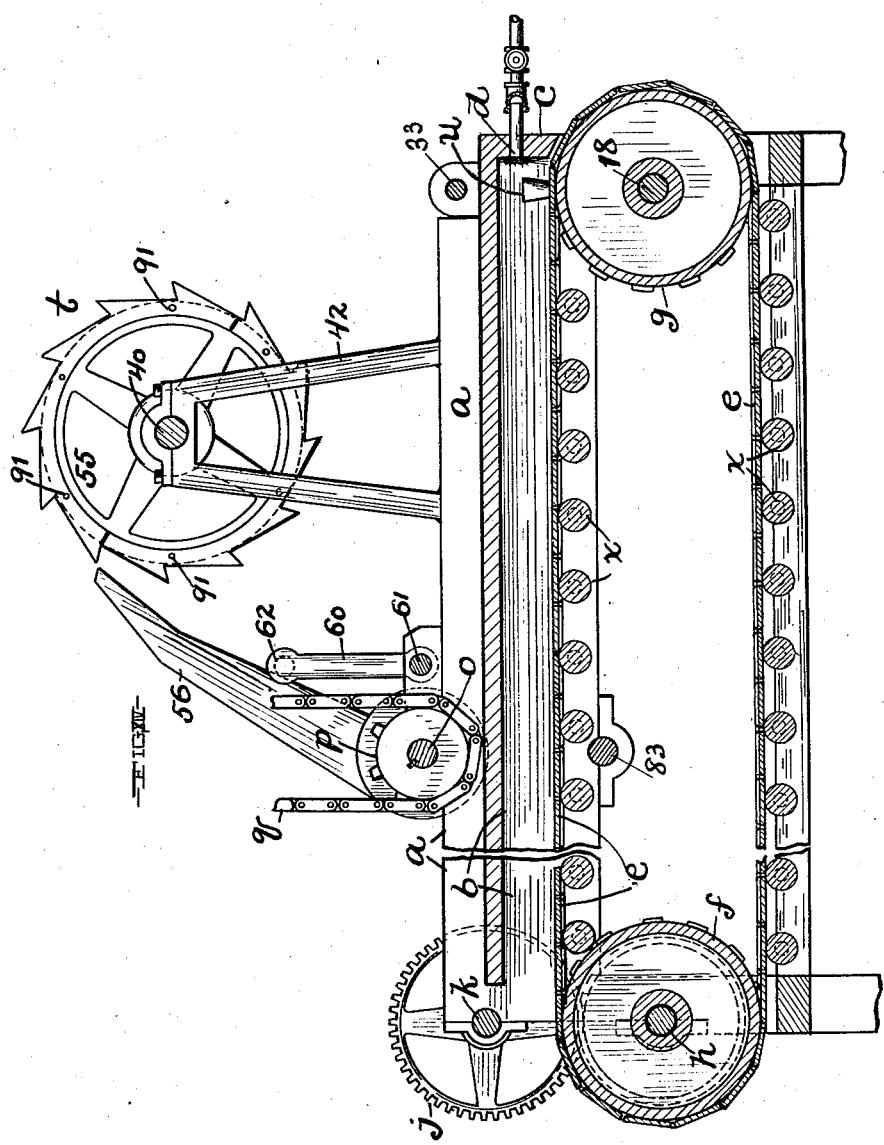
WITNESSES:
INVENTORS
Harry H. Bridgwater
and
Jonathan Haley
BY
Lynch & Dorer
their ATTORNEYS No. 686,254. Patented Nov. 12, 1901.
H. H. BRIDGWATER & J. HALEY.
APPARATUS FOR CONVEYING GLASSWARE INTO AND THROUGH ANNEALING OVENS.
(Application filed Oct. 15, 1900.)
(No Model.) 6 Sheets—Sheet 6.
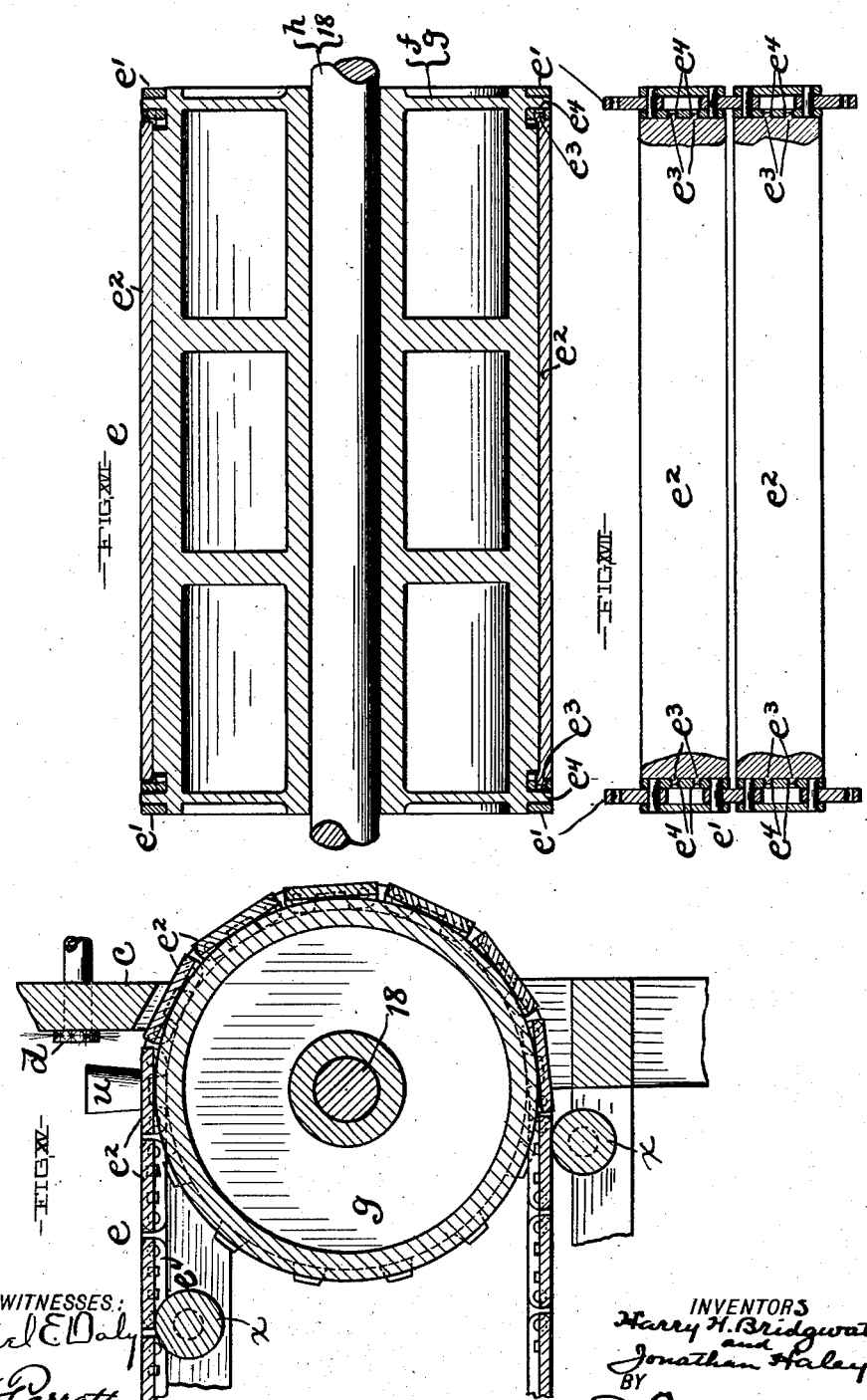
WITNESSES:
Daniel E Daly
A. H. Parratt
INVENTORS
Harry H. Bridgwater
and
Jonathan Haley
BY
Lynch & Dover
their ATTORNEYS

UNITED STATES PATENT OFFICE.

HARRY H. BRIDGWATER AND JONATHAN HALEY, OF AKRON, OHIO, ASSIGNORS TO THE AKRON GLASS AND MACHINERY COMPANY, OF AKRON, OHIO, A CORPORATION OF OHIO.

APPARATUS FOR CONVEYING GLASSWARE INTO AND THROUGH ANNEALING-OVENS.

SPECIFICATION forming part of Letters Patent No. 686,254, dated November 12, 1901.

Application filed October 15, 1900. Serial No. 33,097. (No model.)

*To all whom it may concern:*

Be it known that we, HARRY H. BRIDGWATER and JONATHAN HALEY, residents of Akron, in the county of Summit and State of Ohio, have invented certain new and useful Improvements in Apparatus for Conveying Glassware or other Ware to, into, and through a Leer or Annealing-Oven; and we do hereby declare the following to be a full, clear, and exact description of the invention, such as will enable others skilled in the art to which it pertains to make and use the same.

Our invention relates to improvements in apparatus for conveying glassware and other ware that are to be annealed to, into, and through an annealing oven or chamber.

The object of this invention is to provide apparatus whereby the ware that is to be annealed is conveyed from the place at which the ware is formed to and into and through the annealing-chamber and whereby the work of thus conveying the ware to and through the said chamber is reliably done with great facility.

With this object in view the invention consists in certain features of construction and combinations of parts hereinafter described, and pointed out in the claims.

In the accompanying drawings, Figure I is a top plan of an annealing-oven and apparatus embodying our invention, and portions are broken away in this figure to reduce the size of the drawing. Fig. II is a section on line II II, Fig. I, looking in the direction indicated by the arrow. Fig. III is an elevation, largely in section, on line III III, Fig. I, looking in the direction indicated by the arrow. Fig. IV is an elevation in section on line IV IV, Fig. I. Figs. II, III, and IV are drawn on a larger scale than Fig. I. Fig. V is a front side elevation of the annealing-oven and apparatus embodying our invention, and portions are broken away in this figure to reduce the size of the drawing. Fig. VI is a top plan in section on line VI VI, Fig. V. Fig. VII is an elevation, mostly in section, on line VII VII, Figs. I and V, looking in the direction indicated by the arrow. Fig. VIII is an elevation of the ratchet-wheel 55 detached, and Fig. IX is a transverse section on line IX IX, Fig. VIII. Fig. X is a transverse section of the ware-receiving end of the annealing-chamber and shows a row of twelve glasses or articles delivered to the conveyer $e$, that forms the bottom of the said chamber. Fig. XI is an elevation in transverse section on line XI XI, Fig. I, looking in the direction indicated by the arrow. Fig. XII is an elevation of the cam-wheel $t$ detached, and Fig. XIII is a transverse section on line XIII XIII, Fig. XII. Fig. XIV is a vertical longitudinal section of the annealing oven or furnace, taken between the cam-wheel and the ratchet-wheel of the ware-feeding mechanism. Portions are broken away in this figure to reduce the size of the drawing. Fig. XV is a vertical longitudinal section of the receiving end of the conveyer $e$ and the adjacent portion of the end wall $c$ of the annealing-oven. Fig. XVI is a vertical longitudinal section of either roller $f$ or $g$ and shows the roller-engaging portion of the conveyer $e$. Fig. XVII is a plan, partly in section and in detail, illustrative of the construction of the conveyer $e$. Figs. XV, XVI, and XVII show the parts illustrated thereby on a larger scale than the remaining figures.

Referring to the drawings, $a$ designates the casing of an annealing oven or chamber. The chamber $b$ is open at its discharging end, but is closed at its opposite or receiving end by a wall $c$, at which the gas-burners $d$ or other means for supplying the heat to the receiving end of the chamber are provided. The bottom of the chamber $b$ is formed by an endless belt or conveyer $e$, that extends longitudinally of the chamber. The belt or conveyer $e$ is of course arranged horizontally and is applied in the usual manner, leading over corresponding rollers $f$ and $g$, that are correspondingly arranged and suitably supported at the ends of and below the chamber. The roller $f$, that is arranged at the discharging end of the chamber $b$, constitutes the driving-roller of the conveyer $e$ and is fixed or operatively mounted upon a correspondingly-arranged shaft $h$, which is supported in any approved manner from the side walls of the casing $a$. The shaft $h$ extends outside of the said casing at each side of the annealing-chamber, and a spur-gear $i$ is fixed or operatively mounted upon the shaft at the rear side of the casing $a$ and meshes with a spur-gear $j$, which is fixed or operatively mounted upon the shaft $k$, arranged a suitable distance above and parallel with the shaft $h$ and supported from the casing $a$. The shaft $k$ at the forward side of the casing $a$ is operatively provided with a sprocket-wheel $l$, that is operatively connected by an endless chain $m$ with a sprocket-wheel $n$, loosely mounted upon the driving-shaft $o$, that is provided with a driving sprocket-wheel $p$, to which power is applied by a suitably-driven chain $q$. (Shown only in Figs. I and XIV.) The shaft $o$ is arranged horizontally and extends transversely of and is supported from the top of the casing $a$. The shaft $o$ is rotated continuously in the direction required to render it capable, when operative connection is established between the sprocket-wheel $n$ and the shaft, of actuating the belt or conveyer $e$ in the direction required to convey any ware upon the said belt toward the discharging end of the annealing-chamber.

The forward side wall of the casing $a$ at the receiving end of the annealing-chamber has a doorway or inlet 10, (see Figs. V, VII, and X,) through which the articles or ware that are to be annealed are introduced into the said chamber upon the belt or conveyer $e$, and we would here remark that the said articles are arranged upon the belt or conveyer in rows extending transversely of the conveyer. By the apparatus illustrated, as will hereinafter fully appear, twelve articles are arranged in a row upon the belt or conveyer $e$ within the receiving end of the annealing-chamber and a short distance apart transversely of the conveyer before the conveyer is actuated, as required, to feed the said row of articles toward the chamber's opposite or discharging end. The belt or conveyer $e$ is actuated intermittently, as will hereinafter more fully appear, and the said conveyer every time a row of articles has been introduced upon the conveyer is actuated far enough to accommodate another row of articles thereon.

A clutch for establishing operative connection between the sprocket-wheel $n$ and the shaft $o$ is provided. One member 12 of this clutch is formed upon the sprocket-wheel $n$, and the companion clutch member 13 is operatively mounted upon the shaft $o$ by the well-known means of groove and feather 14, (see Fig. IV,) so as to render the last-mentioned clutch member slidable endwise upon the shaft without interrupting operative connection between it and the shaft. Obviously, therefore, operative connection between the sprocket-wheel $n$ and the shaft $o$ is established or interrupted according as the shiftable clutch member 13 is slid into or out of operative engagement with the sprocket-wheel's clutch member 13.

An endless belt or conveyer $r$ extends from the place where the glassware or other ware that is to be annealed is formed to and forward of the doorway or inlet 10, leading to the receiving end of the annealing-chamber. The belt or conveyer $r$ consists of two parallel chains 15 and 15, that are arranged a suitable distance apart and at the receiving end of the said conveyer lead over corresponding sprocket-wheels 16, that are supported in any approved manner. The belt or conveyer $r$ at its ware-delivering end outside of the doorway or inlet 10 has its chains leading over corresponding sprocket-wheels 17, that are fixed together and supported and driven in any approved manner. The roller $g$, that engages the receiving end of the belt or conveyer $e$, is preferably mounted upon a shaft or axle 18, that is supported in any approved manner, and the sprocket-wheels 17 are loose upon the shaft or axle 18. The belt or conveyer $r$ comprises also frames 19, connecting the chains 15 together and arranged at suitable intervals longitudinally of the said conveyer. Each frame 19 is provided with a vertically-tiltable leaf or platform 20, that when it travels with the upper or ware-feeding section of the conveyer $r$ normally inclines upwardly or outwardly at the outer surface of the conveyer, as shown very clearly in Fig. II, in the direction of the receiving end of the conveyer, and has its inner end hinged or pivoted horizontally, as at 21, to the frame 19, supporting it and transversely of the conveyer.

The conveyer $r$, as already indicated, has its ware-delivering end extending in front of the doorway or inlet 10 of the annealing-chamber, and a bridge-forming plate 25 extends from and in close proximity to the said end of the conveyer $r$ to and over the threshold of the said doorway or inlet into close proximity to the receiving end of the conveyer $e$, so that an article that is to be annealed and that is conveyed by the conveyer $r$ to and in front of the said inlet can be fed or removed from the conveyer $r$ onto the bridge 25 and slid over the said bridge through the said inlet and onto the conveyer $e$. The conveyers $e$ and $r$ have their upper or ware-feeding portions arranged, preferably, in the same horizontal plane, and the bridge 25 is arranged with its upper surface flush with the upper surfaces of the said conveyer-sections.

The means employed for feeding the ware from the conveyer $r$ through the doorway or inlet 10 and onto the conveyer $e$ comprises, preferably, the following: An upright head 30 is normally arranged directly opposite the doorway or inlet 10 of the annealing-chamber and over and in close proximity to the ware-delivering end of the upper or ware-feeding section of the conveyer $r$ at the forward side of the path of the tilting leaves or platforms 20 of the said conveyer. The head 30 is V-shaped or U-shaped in plan, as shown in Figs. I, VII, and X, so as to render the said head capable of partially embracing the article that is to be removed from the conveyer r to the conveyer e, and thereby prevent displacement of the ware longitudinally of the conveyers during the operation of the said feeding device. The conveyer r is actuated in any approved manner in the direction of the annealing-chamber so as to bring the ware-carrying leaves or platforms 20 thereof opposite the head 30—that is, between the said head and the inlet 10 of the annealing-chamber. Simultaneously with the arrival of a leaf or platform 20 between the head 30 and the inlet 10 the ware-feeding head 30 is actuated toward the said inlet, as will hereinafter more fully appear, and removes any article upon the said leaf or platform to and through the inlet 10 onto the conveyer e. The ware-feeding head 30 has a stock or shank 31, that extends from the outer side or back of the head a suitable distance and is rigid at its outer end with an arm 32, depending from and rigid with the forward or adjacent end of an endwise-shiftable rod or bar 33, that is arranged horizontally and transversely of and suitably supported from the top of the casing a. The bar or rod 33 at the upper side is provided with an upright arm carrying an antifriction-roller 34, which engages a slot 35, formed in and longitudinally of a lever 36, that is arranged longitudinally of the top of the casing a and vertically fulcrumed at one end, as at 37, to the said casing. The lever 36 has therefore a sweep in a horizontal plane above the annealing-chamber and is operatively connected with the rod or bar 33, and consequently with the ware-feeding head 30. In the normal position of the parts the lever 36 is in its forwardly-swung or normal position, and means acting to retain the said lever, and consequently the ware-feeding head 30, in their normal position is provided and comprises, preferably, a weight or poise 38, attached to one end of a rope or cable 39, that leads from the said poise upwardly to and over a guide-sheave 41, suitably supported from the forward side of the casing a, and thence leads rearwardly and has its opposite end attached to the lever 36 at any suitable point between the fulcrum and the slotted end of the lever. Obviously the ware-feeding head 30 and any article in advance thereof upon a leaf or platform of the conveyer r are moved onto the conveyer e during the rearward oscillation or swinging of the lever 36 against the action of the poise 38.

The ware fed into the annealing-chamber is within the said chamber disposed in rows arranged transversely of the conveyer e, and upon the introduction into the annealing-chamber of each row of articles the said conveyer is actuated in the direction required to advance the said row in the direction of the discharging end of the chamber far enough to accommodate the formation of another row of articles upon the said conveyer. Consequently whenever a row of articles has been formed upon the conveyer e the shiftable clutch member 13, by mechanism hereinafter described, is moved into operative engagement with the companion clutch member 12, so as to establish operative connection between the shaft o and the conveyer e; but the clutch is again rendered inoperative, as will hereinafter more fully appear, when the said row has been advanced far enough in the direction of the discharging end of the annealing-chamber to accommodate the formation of another row upon the said conveyer. It will be observed, therefore, that the ware-feeding head 30 in order to arrange the ware fed thereby into the annealing-chamber in a row upon and transversely of the conveyer e must in feeding the first member of the said row be actuated the maximum distance that it is capable of being moved during the operation of the machine, so as to move the said member of the row into the most rearward portion of the said chamber, and that the travel of the said head during each subsequent ware-feeding operation thereof in the formation of the said row must be shortened enough to free the article next previously fed thereby, and consequently the shortest travel of the said head will occur when the last member of the row is being fed into the aforesaid chamber.

The means for accomplishing the required travel of the ware-feeding head 30 during each operation of the said head in the formation of a row of articles or ware upon the conveyer e comprises, preferably, a cam-wheel t, which is fixed or operatively mounted upon a shaft 40, arranged horizontally and transversely of and a suitable distance above the casing a. Preferably the shaft 40 is supported from standards 42, rigid with the casing a. The shaft 40 is arranged intermediate between the rod or bar 33 and the driving-shaft o. The cam-wheel t has a series of cams t', $t^m$, and $t^{12}$, formed thereon at suitable intervals along the periphery and circumferentially of the wheel. The shaft 40 is intermittently rotated, as will hereinafter more fully appear, in the direction indicated by the arrow. The cams travel during the rotation of the wheel t in one and the same path, and the working surfaces 46 of the said cams have the trend and arrangement required to render them during the rotation of the wheel capable of engaging a roller 47, with which the lever 36 is provided, and thereupon actuating the said lever in the direction required to operate the ware-feeding head 30 against the action of the poise 38. The cams vary in size or dimensions, and consequently in their lever-throwing capacity. For instance, the working surface of the cam t', adapted to effect the longest travel of the head 30, is longer and projects farther from the body portion of the cam-wheel than the working surface of the next succeeding cam, and consequently is capable of swinging or throwing the lever 36 farther than the said succeeding cam. The cam $t^{12}$, adapted to effect the shortest travel of the said head and that is the last cam of the series of cams to operate in the formation of a row of articles or ware upon the conveyer $e$, has its working surface projecting the shortest distance from the body portion of the cam-wheel. Each intermediate cam $t^m$ has a working surface projecting farther from the body portion of the cam-wheel than the next succeeding cam and capable of throwing the lever 36 farther than the said succeeding cam, but projects a shorter distance from the wheel's body portion than the next preceding cam, and consequently is incapable of throwing the lever 36 as far as the said preceding cam, yet the difference between the trend, length, and arrangement of the working surfaces of any two adjacent intermediate cams is such as to prevent the work done by any one of the said cams from interfering with the work done by the next preceding cam and to avoid obstructing the work to be done by the next succeeding cam. Of course adjacent cams of the series of cams are far enough apart to accommodate the reception between them of the lever's roller 47 during the rotation of the cam-wheel, and obviously the said roller as soon as it becomes disengaged from the working surface of any cam during the rotation of the cam-wheel is caused to jump by the action of the poise 38 from the said surface into the space between the said cam and the working surface of the next succeeding cam, so as to come into position to be acted upon by the inner end of the last-mentioned working surface.

A ratchet-wheel 55 is operatively mounted upon the cam-shaft at the rear side of the machine, and this wheel has as many teeth as there are cams $t'$, $t^m$, and $t^{12}$ upon the cam-wheel $t$, and the relative arrangement of the said teeth corresponds with the relative arrangement of the said cams, so that the actuation of the ratchet-wheel the distance of one tooth will have effected the operation of a cam of the cam-wheel, and all of the cams shall have operated once during each complete rotation of the ratchet-wheel. A pawl 56 is arranged to engage and intermittently actuate the ratchet-wheel. The pawl 56 projects upwardly from the driving-shaft $o$ and has its lower end loosely mounted or journaled upon the wrist 57 of a crank 58, which is formed upon the said shaft. The pawl is actuated up and down, therefore, during each rotation of the shaft $o$, but is normally held out of engagement with the ratchet-wheel, so that the pawl normally moves idly. However, the pawl leans normally toward the ratchet-wheel and is prevented from falling against the ratchet-wheel by an upright arm or lever 60, which is formed or operatively mounted upon a shaft 61, that is arranged horizontally and transversely of and suitably supported from the top of the casing $a$ between the driving-shaft $o$ and the cam-shaft 40, but near the driving-shaft. The arm or lever 60 has its upper end provided with a horizontally-arranged pin or projecting member 62, that normally engages the ratchet-wheel-facing surface of the pawl and prevents the pawl from gravitating against the ratchet-wheel. The shaft 61 at the forward side of the casing $a$ is provided with a depending arm or lever 63, (see Figs. I and V,) which has its lower end operatively connected with an endwise-shiftable rod or bar 65, that is arranged horizontally and longitudinally of the forward side of the casing $a$ and has bearing in boxes 66 and 66, arranged a suitable distance apart and rigid with the said casing. A spiral spring 67 is mounted and confined upon the bar or rod 65 between one of the boxes 66 and a collar or shoulder 68, formed externally of and upon the said rod or bar and acts to retain the latter and the connected mechanism in their normal position. The free end of the rod or bar 65 extends into the path of the free end of a curved arm 22, projecting from the under side of each ware-laden leaf or platform 20 of the conveyer $r$—that is, each leaf or platform 20 has an arm 22, that when the said leaf or platform forms a portion of the upper or ware-carrying section of the conveyer $r$ curves or projects from the lower side of the leaf or platform in the direction of the rod or bar 65. The arrangement of parts is such that the arm 22 of a leaf or platform 20 when there is no article or ware upon the said leaf or platform shall clear the free end of the rod or bar 65 during the operation of the conveyer $r$, because the said leaf or platform, as already indicated, normally inclines in the direction required to cause its said arm 22 to be inoperative. When, however, the leaf or platform is laden and by the load tilted into a horizontal position flush with the upper surface of the frame 19, to which the said leaf or platform is hinged or pivoted, the arm 22 of the leaf or platform is rendered operative and then has its free end arranged to extend during the operation of the conveyer $r$ into the path of the free end of the rod or bar 65, and the engagement and actuation of the said bar or rod 65 against the action of the spring 67 by the operative arm 22 of the laden leaf or platform 20 will result in the oscillation of the shaft 61 in the direction required to free the pawl 56 and render the latter operative, because the pawl as soon as the engaging shaft arm or lever 60 frees it will tilt by gravity, as already indicated, into engagement with the ratchet-wheel and result in the operation of the cam-wheel. In Figs. I and III a glass or article $u$ that is to be annealed is shown upon a leaf or platform 20 and has its free end provided with a depending flange 23, that in the horizontal position of the leaf or platform engages a flange or shoulder 24, formed upon the frame 19, that bears the said leaf or platform. The said flanges or shoulders 23 and 24 constitute a stop arranged to limit the tilting of the leaf or platform by the load and arrest the tilting leaf or platform as soon as the latter comes into its horizontal position. The parts are so arranged and timed that when the first laden leaf or platform 20 of the conveyer $r$ comes into position in front of the doorway or inlet 10 of the annealing-chamber the feeder 20 shall be in position ready to remove the article or load from the said leaf or platform through the said inlet onto the conveyer $e$, and the cam that has the greatest lever-throwing capacity shall be in position to commence its operation upon the feeder-operating lever 36, and the rod or bar 65 will have just been operated by the arm 22 of the said leaf or platform, so as to result in the operation of the said cam and in the actuation of the feeder the maximum distance required to place the first member of a row of ware to be formed upon the conveyer $e$ in the proper position upon the said conveyer. The arm 22 of the next succeeding leaf or platform 20 of the conveyer $r$ will result in the operation of the next succeeding or first intermediate cam, and so on until all the cams of the series of cams have operated and a row of ware has been arranged upon the conveyer $e$ when the said conveyer $e$ is actuated, as already indicated, the distance required to make room thereon for another row of ware. When the last-operating cam $t^{12}$ of the series of cams has operated, operative connection between the members 12 and 13 of the clutch is established, so as to effect the aforesaid actuation of the conveyer $e$, and the shiftable member 13 of the said clutch is provided with an annular groove 70, that is engaged by the forked end 71 of a lever 72, that is arranged upon and fulcrumed or pivoted vertically, as at 73, at any suitable point between its ends to the casing $a$. The lever 72 has its opposite end provided with a roller 74, that engages a groove 75 formed in the periphery and circumferentially of the cam-wheel $t$. This groove 75 between the smallest and last-operating cam $t^{12}$ and the largest and first-operating cam $t'$ of the series of cams has such a cam-forming trend, as at 76, (see Figs. I and VI,) and the parts are so arranged and timed that as soon as the feeder 30 has disengaged the delivered ware or article upon the completion of the operation of the last-operating cam the clutch shall commence to operate and complete its operation, and thus have actuated the conveyer $e$ preparatory to the commencement of the feeding of the next row of ware to the said conveyer.

Preferably the conveyer $r$ is operatively connected with the driving-shaft $o$, and, as shown in Figs. I and V, a sprocket-wheel 80 is fixed to and has its axis coincident with the sprocket-wheels 17 of the said conveyer and is operatively connected by a chain 81 with a sprocket-wheel 82, which is operatively mounted upon a shaft 83, that is arranged a suitable distance below and parallel with the shaft $o$ and supported from the casing $a$ in any approved manner. A spur-gear 84 is keyed to the shaft 83 and meshes with a spur-gear 85, keyed to the shaft $o$. The said operative connection between the conveyer $r$ and the shaft $o$ is instrumental in actuating the said conveyer in the direction required to convey the ware or articles to be annealed to the feeder 30.

In Fig. X a row of glasses or articles $u$ that are to be annealed is formed upon the conveyer $e$. The glasses or articles to be annealed are not always the same in size or dimensions. The glasses or articles to be annealed may be so large that six of them or less than twelve can only be arranged in a row upon the conveyer $e$. Again, the articles requiring annealing might be so small that twenty-four of them, or at least more than twelve, could be arranged in a row upon the said conveyer $e$. To enable the largest number of articles requiring annealing to be arranged in a row upon the conveyer $e$ at all times and to avoid the necessity of replacing or changing the entire ratchet-wheel 55 and the whole of the cam-wheel $t$, the toothed portion of the ratchet-wheel and the feeder-operating cams forming portion of the cam-wheel are made detachable from the remainder or body portion of the respective wheel.

Figs. V, VIII, IX, and XI illustrate the construction of the ratchet-wheel, and upon reference to the said figures it will be observed that the toothed peripheral surface of the said wheel is formed by two half-rings 90 and 90, suitably assembled and removably secured by bolts or screws 91 to the remainder or body portion of the wheel.

Figs. XII and XIII are illustrative of the construction of the cam-wheel $t$, and upon reference to these figures it will be observed that the feeder-operating cams forming portion of the said wheel are formed by two half-rings 95 and 95, suitably assembled and removably secured by bolts or screws 96 to the remainder or body portion of the wheel, and all of the cams $t'$, $t^m$, and $t^{12}$ are formed upon the said half-rings 95.

The annealing oven or furnace is shown more clearly in Fig. XIV, and it will be observed that the conveyer $e$ leads over suitably-supported intermediate rollers $x$.

A suitable construction of the conveyer $e$ is illustrated in Figs. XV, XVI, and XVII. The conveyer $e$ comprises two parallel endless chains $e'$ and $e'$, leading over opposite ends, respectively, of the rollers $f$ and $g$, as shown very clearly in Fig. XV, and each of the said rollers is a sprocket-roller, having radial peripheral projections for engaging with the links of the chains. The ware-carrying portion of the conveyer $e$ comprises metallic plates $e^2$, arranged and extending between and engaging the chains $e'$ and $e'$. A suitable attachment of the plates $e^2$ to the chains is by means of projections $e^3$ formed upon the ends of the plates and engaging corresponding apertures $e^4$ formed in the plate-engaging links of the chains, as shown very clearly in Fig. XVII. Each plate $e^2$ is wide enough to receive the articles or ware to be annealed, and the arrangement of parts is such that the plates $e^2$ of the conveyer $e$ are successively brought into position for receiving ware during the intermittent operation of the said conveyer. However, any conveyer $e$ suitable for receiving the ware to be annealed and capable of withstanding the heat within the annealing oven or furnace will answer the purpose.

What we claim is—

1. The combination, with an annealing-oven having a doorway or inlet for receiving the ware that is to be annealed, and a conveyer for conveying the ware to and in front of the said inlet, of a device for feeding the ware from the said conveyer through the aforesaid inlet into the oven, means acting to retain the feeding device in its normal position ready to feed, and cam-actuated mechanism for operating the feeding device against the action of the means acting to retain the said device in its normal position.

2. The combination, with an annealing-oven having a door or inlet for receiving the ware that is to be annealed, and a conveyer for conveying the ware to and in front of the said inlet, of an endwise-shiftable rod or bar supported above and arranged transversely of the oven and provided, at one end, with a depending arm that terminates, at its lower end, in the inwardly-extending shank or stock of a feeding device comprising an upright head at the inner end of the said stock or shank for engaging the ware upon the conveyer, means acting to retain the feeding device in its normal position ready to remove ware from the conveyer through the aforesaid inlet into the oven, and mechanism for operating the feeding device.

3. The combination, with an annealing-oven provided with a door or inlet for receiving the ware to be annealed, and a conveyer for conveying the ware to and in front of the said inlet, of a feeding device arranged to remove the ware from the conveyer through the aforesaid inlet into the oven, an endwise-shiftable rod or bar supported from the casing of the oven and operatively connected with the aforesaid feeding device, means acting to retain the feeding device in its normal and inoperative position, and cam-actuated mechanism for operating the said bar or rod.

4. The combination, with an annealing-oven having a door or inlet for receiving the ware to be annealed, and a conveyer for conveying the ware to and in front of the said inlet, of a feeding device for removing the ware from the said conveyer through the aforesaid inlet into the oven, a suitably-supported endwise-shiftable rod or bar operatively connected with the said feeding device and provided with an antifriction-roller, and a suitably-supported lever having a slot extending longitudinally thereof and engaged by the aforesaid roller, substantially as and for the purpose set forth.

5. The combination, with an annealing-chamber, a conveyer forming the bottom of the chamber, a door or inlet leading to the chamber, and an external conveyer for carrying the ware to and in front of the said inlet, of a feeding device for removing the ware from the last-mentioned conveyer through the aforesaid inlet onto the first-mentioned conveyer, a lever operatively connected with the said feeding device and provided with an antifriction-roller, a cam-wheel arranged to engage the said roller and thereupon operate the lever, and means acting to retain the lever in its normal and inoperative position.

6. The combination, with an annealing-chamber, a conveyer for carrying ware or articles to be annealed through the said chamber, and a door or inlet leading to the conveyer at one side of the chamber, of a feeding device for feeding ware onto the said conveyer through the aforesaid inlet, a lever for operating the feeding device, and a series of revoluble cams arranged to successively operate the lever and the first-operating cam of the said series having the greatest lever-throwing capacity and each of the remaining cams having less lever-throwing capacity than the next-previously-operating cam during the operation of the aforesaid series of cams, substantially as and for the purpose set forth.

7. The combination, with an annealing-chamber, a conveyer forming the bottom of the chamber, a door or inlet leading to the said conveyer, and an external conveyer for carrying the ware to and in front of the said inlet, of a feeding device for removing the ware from the last-mentioned conveyer through the aforesaid inlet onto the first-mentioned conveyer and normally in position to perform its function, a lever operatively connected with the feeding device, and mechanism constructed to effect a series of operations of the said lever and throw the said lever the maximum distance during the first operation of the said series of operations, and effect a reduction in the throw of the lever during each succeeding operation of the said series of operations, substantially as and for the purpose set forth.

8. The combination, with an annealing-chamber, a conveyer forming the bottom of the chamber, a door or inlet leading to the said conveyer, and an external conveyer for carrying the ware to and in front of the said inlet, of a feeding device for removing the ware from the last-mentioned conveyer through the aforesaid inlet onto the first-mentioned conveyer and normally in position to perform its function, means acting to retain the said feeding device in its normal position, a lever operatively connected with the feeding device, and a series of revolving cams arranged to successively operate the lever, and the first-operating cam of the said series having the greatest lever-throwing capacity and each of the remaining cams having less lever-throwing capacity than the next-previously-operating cam during the operation of the aforesaid series of cams, substantially as and for the purpose set forth.

9. The combination, with an annealing-chamber, and a conveyer for carrying ware or articles to be annealed through the chamber, another conveyer for carrying the ware to and at one side of the first-mentioned conveyer, and a feeding device for removing the ware from the second-mentioned conveyer onto the first-mentioned conveyer, of a lever operatively connected with the said feeding device, and a cam-wheel having a series of cams adapted to operate the lever and arranged concentrically of its axis and at suitable intervals circumferentially of the wheel, and the first-operating cam of the series having the greatest lever-throwing capacity and each of the remaining cams having less lever-throwing capacity than the next-previously-operating cam during the operation of the aforesaid series of cams.

10. The combination, with an annealing-chamber, a conveyer for carrying ware or articles to be annealed through the said chamber, and a door or inlet leading to the conveyer at one side of the chamber, of a feeding device for feeding ware onto the said conveyer through the aforesaid inlet, a lever for operating the feeding device, and a cam-wheel having a series of cams for operating the said lever, which cams are arranged circumferentially of the wheel, the first-operating cam of the series having the greatest lever-throwing capacity, each of the remaining cams having less throw than the next-previously-operating cam during the operation of the series of cams, and the cam-forming portion of the wheel being detachable from the remainder or body portion of the wheel, substantially as and for the purpose set forth.

11. The combination, with an annealing-chamber, a conveyer for carrying the articles or ware to be annealed through the said chamber, a feeding device for feeding ware onto the conveyer from one side of the conveyer and normally in position ready to feed, means acting to retain the feeding device in its normal position, and a lever operatively connected with the feeding device, of a shaft, a cam-wheel operatively mounted upon the shaft and provided with a series of cams for operating the aforesaid lever, which cams are arranged at suitable intervals circumferentially of the wheel, with the first-operating cam of the series having the greatest lever-throwing capacity and with each of the remaining cams having less throw than the next-previously-operating cam during the operation of the series of cams, a ratchet-wheel operatively mounted upon the shaft and having teeth corresponding in number and relative arrangement to the aforesaid cams of the cam-wheel, a pawl arranged to operate the ratchet-pawl and normally inoperative, and means for rendering the pawl operative, substantially as and for the purpose set forth.

12. The combination, with an annealing-chamber, a conveyer for carrying the articles or ware to be annealed through the annealing-chamber, a feeding device for feeding ware onto the conveyer from one side of the conveyer, mechanism for operating the feeding device, a shaft, and a cam-wheel operatively mounted on the shaft and provided with a series of cams for operating the said mechanism, which cams are arranged at suitable intervals circumferentially of the wheel with the first-operating cam of the series having the greatest throwing capacity and with each of the remaining cams having less throw than the next-previously-operating cam during the operation of the series of cams, of a ratchet-wheel operatively mounted on the shaft and having teeth corresponding in number and relative arrangement to the aforesaid cams of the cam-wheel and having the toothed peripheral portion of the wheel detachable from the remainder or body portion of the wheel, substantially as and for the purpose set forth.

13. The combination, with an annealing-chamber, a conveyer for carrying the articles or ware to be annealed through the annealing-chamber, a feeding device for feeding ware onto the conveyer from one side of the conveyer, mechanism for operating the feeding device, a shaft, and a cam-wheel operatively mounted on the shaft and provided with a series of cams for operating the said mechanism, which cams are arranged at suitable intervals circumferentially of the wheel with the first-operating cam of the series having the greatest throwing capacity and with each of the remaining cams having less throw than the next-previously-operating cam during the operation of the series of cams, of a ratchet-wheel operatively mounted on the shaft and having teeth corresponding in number and relative arrangement to the aforesaid cams of the cam-wheel, a pawl arranged to gravitate, when free, into operative engagement with the ratchet-wheel, means for holding the pawl from the ratchet-wheel, and means for rendering the said pawl-holding means inoperative, substantially as and for the purpose set forth.

14. The combination, with an annealing-chamber, a conveyer for carrying the articles or ware to be annealed through the annealing-chamber, a feeding device for feeding ware onto the conveyer from one side of the conveyer, mechanism for operating the feeding device, a shaft, and a cam-wheel operatively mounted on the shaft and provided with a series of cams for operating the said mechanism, which cams are arranged at suitable intervals circumferentially of the wheel with the first-operating cam of the series having the greatest throwing capacity and with each of the remaining cams having less throw than the next-previously-operating cam during the operation of the series of cams, of a ratchet-wheel operatively mounted on the shaft and having teeth corresponding in number and relative arrangement to the aforesaid cams of the cam-wheel, another shaft having a crank, a pawl operatively connected with the crank and arranged to move, when free, into operative engagement with the ratchet-wheel, means for holding the pawl from the ratchet-wheel, and means for rendering the said pawl-holding means inoperative, substantially as and for the purpose set forth.

15. The combination, with an annealing-chamber, a conveyer for carrying the articles or ware to be annealed through the annealing-chamber, a feeding device for feeding ware onto the conveyer from one side of the conveyer, mechanism for operating the feeding device, a shaft, and a cam-wheel operatively mounted on the shaft and provided with a series of cams for operating the said mechanism, which cams are arranged at suitable intervals circumferentially of the wheel with the first-operating cam of the series having the greatest throwing capacity and with each of the remaining cams having less throw than the next-previously-operating cam during the operation of the series of cams, of a ratchet-wheel operatively mounted on the shaft and having teeth corresponding in number and relative arrangement to the aforesaid cams of the cam-wheel, another shaft having a crank, a pawl operatively connected with the crank and arranged to move, when free, into operative engagement with the ratchet-wheel, means for holding the pawl from the ratchet-wheel, means for rendering the said pawl-holding means inoperative, and means for establishing and interrupting operative connection between the pawl-bearing shaft and the aforesaid conveyer, substantially as set forth.

16. The combination, with an annealing-chamber, a conveyer for carrying the articles or ware to be annealed through the annealing-chamber, a feeding device for feeding ware onto the conveyer from one side of the conveyer, mechanism for operating the feeding device, a shaft, and a cam-wheel operatively mounted on the shaft and provided with a series of cams for operating the said mechanism, which cams are arranged at suitable intervals circumferentially of the wheel with the first-operating cam of the series having the greatest throwing capacity and with each of the remaining cams having less throw than the next-previously-operating cam during the operation of the series of cams, of a ratchet-wheel operatively mounted on the shaft and having teeth corresponding in number and relative arrangement to the aforesaid cams of the cam-wheel, another shaft having a crank, a pawl operatively connected with the crank and arranged to move, when free, into operative engagement with the ratchet-wheel, means for holding the pawl from the ratchet-wheel, means for rendering the said pawl-holding means inoperative, a sprocket-wheel loose upon the pawl-bearing shaft and operatively connected with the aforesaid conveyer, and means for establishing and interrupting operative connection with the said sprocket-wheel and the pawl-bearing shaft, substantially as and for the purpose set forth.

17. The combination, with an annealing-chamber, a conveyer for carrying the articles or ware to be annealed through the annealing-chamber, a feeding device for feeding ware onto the conveyer from one side of the conveyer, mechanism for operating the feeding device, a shaft, and a cam-wheel operatively mounted on the shaft and provided with a series of cams for operating the said mechanism, which cams are arranged at suitable intervals circumferentially of the wheel with the first-operating cam of the series having the greatest throwing capacity and with each of the remaining cams having less throw than the next-previously-operating cam during the operation of the series of cams, of a ratchet-wheel operatively mounted on the shaft and having teeth corresponding in number and relative arrangement to the aforesaid cams of the cam-wheel, another shaft having a crank, a pawl operatively connected with the crank and arranged to move, when free, into operative engagement with the ratchet-wheel, means for holding the pawl from the ratchet-wheel, means for rendering the said pawl-holding means inoperative, and mechanism instrumental in establishing and interrupting operative connection between the pawl-bearing shaft and the aforesaid conveyer and arranged to be operated by the aforesaid cam-shaft, substantially as and for the purpose set forth.

18. The combination, with an annealing-chamber, a conveyer for carrying the articles or ware to be annealed through the annealing-chamber, a feeding device for feeding ware onto the conveyer from one side of the conveyer, mechanism for operating the feeding device, a shaft, and a cam-wheel operatively mounted on the shaft and provided with a series of cams for operating the said mechanism, which cams are arranged at suitable intervals circumferentially of the wheel with the first-operating cam of the series having the greatest throwing capacity and with each of the remaining cams having less throw than the next-previously-operating cam during the operation of the series of cams, of a ratchet-wheel operatively mounted on the shaft and having teeth corresponding in number and relative arrangement to the aforesaid cams of the cam-wheel, another shaft having a crank, a pawl operatively connected with the crank and arranged to move, when free, into operative engagement with the ratchet-wheel, means for holding the pawl from the ratchet-wheel, means for rendering the said pawl-holding means inoperative, a sprocket-wheel loose upon the pawl-bearing shaft and operatively connected with the aforesaid conveyer, a clutch for establishing and interrupting operative connection between the sprocket-wheel and the shaft supporting the said wheel and normally inoperative, and mechanism for operating the clutch, and arranged to be operated by another cam-forming portion of the aforesaid cam-wheel, substantially as set forth.

19. The combination, with an annealing-chamber, a conveyer for carrying articles or ware to be annealed through the said chamber, and a door or inlet leading to the conveyer at one side of the chamber, a feeding device for feeding ware onto the said conveyer through the aforesaid inlet, and mechanism for operating the feeding device and comprising a ratchet-wheel and a pawl for operating the ratchet-wheel, of a shaft having an arm or lever normally holding the pawl out of operative engagement with the ratchet-wheel, means acting to retain the said shaft and its arm or lever in their normal position, and means for effecting the oscillation of the shaft in the direction required to cause its said arm or lever to permit the pawl to move into engagement with the ratchet-wheel.

20. The combination, with an annealing oven or chamber, a conveyer for carrying articles or ware to be annealed through the oven, a feeding device for feeding ware onto the conveyer, and mechanism for operating the feeding device and comprising a ratchet-wheel, and a pawl for operating the ratchet-wheel, of a shaft having an arm or lever normally holding the pawl out of engagement with the ratchet-wheel and having another arm or lever for oscillating the shaft, an endwise-shiftable rod or bar operatively connected with the last-mentioned arm or lever, means acting to retain the said bar or rod and connected mechanism in their normal position, and means for actuating the said rod or bar in the direction required to effect the release of the pawl and permit the pawl to move into engagement with the ratchet-wheel, substantially as and for the purpose set forth.

21. The combination, with an annealing-chamber, a conveyer for carrying articles or ware to be annealed through the said chamber, another conveyer for conveying the articles or ware to the first-mentioned conveyer, a feeding device for removing the ware from the second-mentioned conveyer to the first-mentioned conveyer, and means instrumental in effecting the operation of the feeding device and comprising a movable member, of means upon the second-mentioned conveyer, at intervals longitudinally of the conveyer, for operating the said movable member to result in the operation of the feeding device.

22. The combination, with an annealing-chamber, a conveyer for carrying the articles or ware to be annealed through the said chamber, a feeding device for feeding the ware onto the said conveyer, and mechanism instrumental in effecting the operation of the feeding device, of another conveyer for carrying the ware to and in advance of the feeding device and provided, at suitable intervals longitudinally of the conveyer, with a tiltable leaf or platform adapted to receive and carry an article or ware to be annealed, and the arrangement of parts being such that each leaf or platform shall be inoperative without a load but shall be tilted by the weight of the load when laden into the position required to result in the operation of the aforesaid mechanism during the operation of the conveyer.

23. The combination, with an annealing-chamber, a conveyer for carrying the articles or ware to be annealed through the said chamber, a feeding device for feeding the ware onto the said conveyer, mechanism instrumental in effecting the operation of the feeding device and comprising an endwise-shiftable rod or bar 65, and means acting to retain the said bar or rod in its normal position, of another conveyer for carrying the ware to and in advance of the feeding device and provided, at suitable intervals longitudinally of the conveyer, with a tiltable leaf or platform arranged to be tilted, into a horizontal position, by the weight of an article or ware placed thereon and having a projecting arm 22, and means for limiting the tilting of the leaf or platform by the article or ware, all arranged and operating substantially as shown, for the purpose specified.

24. The combination, with an annealing-chamber, a conveyer for carrying the articles or ware to be annealed through the said chamber, a feeding device for feeding the ware onto the said conveyer, a driving-shaft, mechanism for transmitting motion to the conveyer from the shaft and normally operatively disconnected from the shaft, and means for establishing and interrupting operative connection between the said mechanism and the shaft, of another conveyer for carrying the articles or ware to be annealed to and in advance of the feeding device and an operative connection between the last-mentioned conveyer and the aforesaid shaft, substantially as set forth.

Signed at Bridgeton, New Jersey, by me, the said HARRY H. BRIDGWATER, the 8th day of October, 1900.

HARRY H. BRIDGWATER.

Witnesses to the signature of Harry H. Bridgwater:
CHRISSIE E. SPENCER,
HARRY ALLKIRE.

Signed at Akron, Ohio, by me, the said JONATHAN HALEY, the 3d day of October, 1900.

JONATHAN HALEY.

Witnesses to the signature of Jonathan Haley:
C. H. DORER,
ARTHUR S. MOTTINGER.